United States Patent [19]
Kinner
[11] Patent Number: 4,910,362
[45] Date of Patent: Mar. 20, 1990

[54] ELECTRICAL APPLIANCE WITH HOLDER FOR SECURING AN ELECTRICAL CORD

[76] Inventor: Janet L. Kinner, 7772 Elden Ave., Whittier, Calif. 90602

[21] Appl. No.: 166,692

[22] Filed: Mar. 14, 1988

[51] Int. Cl.[4] .......... D06F 75/28; F16L 3/08
[52] U.S. Cl. .......... 174/135; 24/129 R; 24/304; 174/158 R; 174/175; 219/245; 248/52; 248/65; 248/205.3
[58] Field of Search .......... 174/40 CC, 175, 135, 174/158 R, 164, 165, 166 R, 168, 171, 174; 24/304, 339, 115 R, 129 R; 248/51, 52, 65, 74.1, 74.2, 205.3, 467, 71, 73; 439/527, 528, 568, 574; D8/356, 395, 396; 38/94; 219/245, 256

[56] References Cited

U.S. PATENT DOCUMENTS

| | | | |
|---|---|---|---|
| 2,536,776 | 1/1951 | Smellie | 99/385 |
| 2,704,302 | 3/1955 | Budd | 174/175 |
| 2,721,717 | 10/1955 | Wales | 248/52 |
| 2,961,688 | 11/1960 | Descarries | 15/323 |
| 3,491,971 | 1/1970 | Fisher | 248/205.3 X |
| 3,659,319 | 5/1972 | Erickson | 248/74.1 X |
| 4,576,664 | 3/1986 | Delahunty | 248/205.3 X |

FOREIGN PATENT DOCUMENTS

| | | | |
|---|---|---|---|
| 1185906 | 2/1959 | France | 174/175 |
| 2436518 | 4/1980 | France | 248/74.2 |
| 576759 | 4/1946 | United Kingdom | 174/175 |
| 1078193 | 8/1967 | United Kingdom | 24/304 |
| 1142180 | 2/1969 | United Kingdom | 248/205.3 |
| 1325117 | 8/1973 | United Kingdom | 248/205.3 |

OTHER PUBLICATIONS

Pinnolis, S., "Wire Securing Clip", *Western Electric Technical Digest*, No. 50, Apr. 1978, p. 23.

*Primary Examiner*—Laramie E. Askin
*Attorney, Agent, or Firm*—Edgar W. Averill, Jr.

[57] ABSTRACT

A device for securing an electrical outlet cord to an appliance or other surface so that the plug of the cord can be kept snug to the appliance or other surface. The device has a body with a generally flat bottom which includes an adhesive surface. A channel passes through the body and includes a pair of inwardly directed ribs. The ribs are spaced apart sufficiently to permit insertion of the cord, and once the cord has been inserted, it is held by the inwardly directed ribs. The device can be adhered to an appliance at a position adjacent to where the plug is located after the cord has been wrapped around the appliance to easily hold the cord to the appliance.

4 Claims, 1 Drawing Sheet

ELECTRICAL APPLIANCE WITH HOLDER FOR SECURING AN ELECTRICAL CORD

BACKGROUND OF THE INVENTION

The field of the invention is household devices and the invention relates more particularly to convenience and safety devices relating to electrical cords.

Many small appliances include an electrical cord which is typically stored by wrapping the cord around the appliance when the appliance is not in use. While a few appliances provide means for securing the cord when it is wrapped around the appliance, most do not have such a feature and therefore the storing of such appliances is typically untidy; and when the appliance is removed from its shelf or drawer, many times the cord is entangled on other objects. Secondly, in the use of many appliances, the cord is longer than necessary and means for shortening the cord would facilitate the use of the appliance. Numerous devices have been proposed for the directing of electrical cords; and a clip for routing conduits and conductors is shown in U.S. Pat. No. 3,659,319. While such device is useful for routing conduits and the like, it does not have the ability to securely grasp a cord and, instead, just generally encircles it. A cord holding device is shown in U.S. Pat. No. 4,702,443 which is designed for use on hospital beds, but its size would be impractical for the problem faced by the present applicant. Another cord holding device is shown in U.S. Pat.No. 4,417,710 but this involves the use of an encircling strap which would be difficult to attach and would not provide sufficient convenience. Electrical devices have been secured with adhesive strips as shown in U.S. Pat. No. 3,029,303; and coiling devices were used before the advent of spiral telephone cords as shown in U.S. Pat. No. 1,140,980. Lastly, as shown in U.S. Pat. No. 4,125,243, a sign holder with a resilient base utilizes a device with a curved channel through it. None of the above devices solves the problem of holding an appliance cord at a desired location.

SUMMARY OF THE INVENTION

It is an object of the present invention to provide a device which may be affixed to an appliance, or other surface, for holding an electrical cord.

The present invention is for a device for securing an electrical outlet cord to an appliance, or other surface, so that the plug of the cord can be kept snug to the appliance or other surface. The device has a body with a generally flat bottom, having a delayed-tack adhesive affixed thereto. The body has sides which extend upwardly from the bottom, and a channel extends from one side to the opposite side of the body. The channel has an opening with a bottom surface and two sides, each of the sides terminating in an inwardly directed cord-holding rib. The inner edge of the cord-holding rib on each side is separated apart a distance sufficient to permit the passage of a cord between the ribs. The device will also hold a round cord which may be squeezed between the ribs and then held in the channel by the ribs. Preferably, the device has a generally cylindrical outer shape with two angled surfaces passing from near the opening of the channel to near the bottom of the device. In use, the delayed-tack adhesive surface is typically covered with release paper. When attaching the device to, for instance, an electric iron, the cord of the iron would be wrapped around the handle in a normal manner and after the position of the plug is observed, the release paper is removed from the delayed-tack adhesive and affixed to the iron at a point that snugly holds the cord in its wrapped configuration. Preferably, the device is made from an electrically insulative material such as a polymeric compound.

DESCRIPTION OF THE PREFERRED EMBODIMENTS

Figure 1:
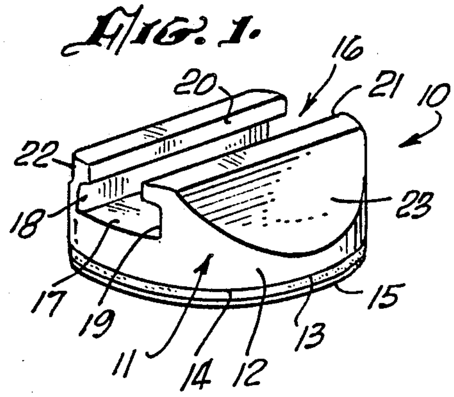
FIG. 1 is perspective view of the cord holding device of the present invention.
Figure 2:
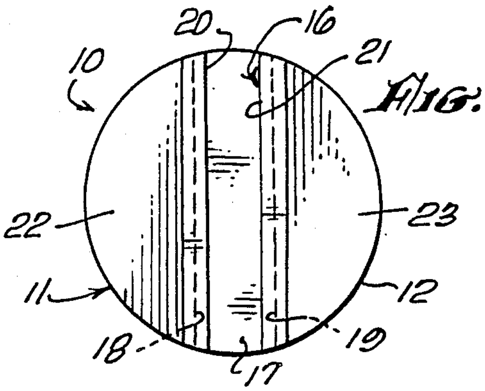
FIG. 2 is a top view thereof.
Figure 3:
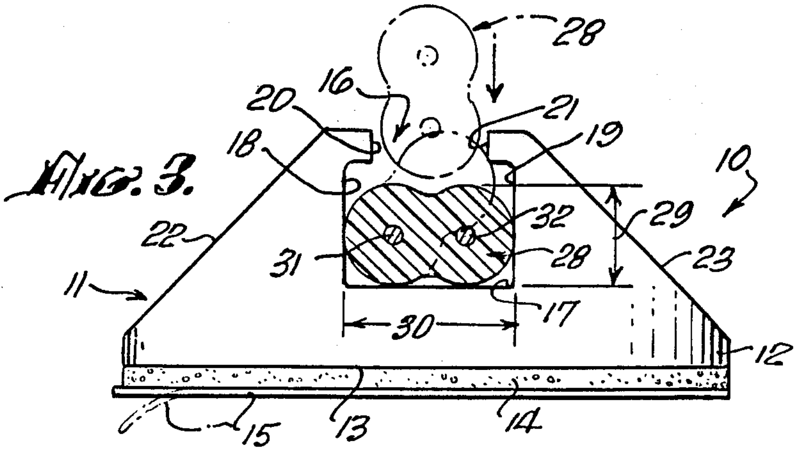
FIG. 3 is a side view thereof.

The cord holding device of the present invention is shown in perspective view in FIG. 1 and indicated by reference character 10. Cord holding device 10 has a generally cylindrical body 11 having a cylindrical side 12 and a generally flat bottom 13, shown best in FIG. 3. Bottom 13 has a layer of delayed-tack adhesive, preferably a foam with an adhesive surface which is indicated by reference character 14 in FIG. 3. A layer of release paper 15 is held against the undersurface of adhesive layer 14 in a conventional manner and, of course, is removed prior to adhering the cord holding device 10 to a surface.

Cord holding device 10 has a channel indicated generally by reference character 16. Channel 16 has a bottom surface 17 and two sides 18 and 19, each of which terminate in inwardly directing cord-holding ribs 20 and 21, respectively. A pair of angled surfaces 22 and 23 makes the device less obtrusive while using the appliance.

Figure 5:
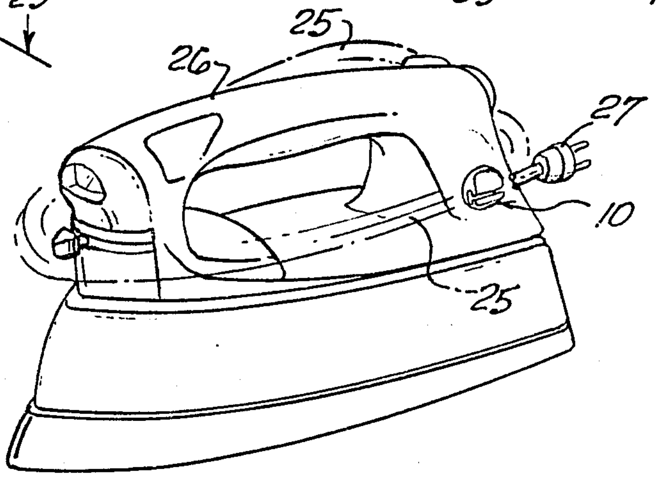
FIG. 5 is a perspective view of an iron utilizing the device of the present invention.

In use, as indicated in FIG. 5, an electrical cord 25 is wrapped around the handle 26 of an iron. After the cord 25 has been wrapped around the handle 26, the position of the plug 27 is noted. The release paper 15 is removed from a cord holding device 10 and the device is placed shortly upstream from the plug 27 so that the handle and plug are securely held to the iron handle.

Figure 4:
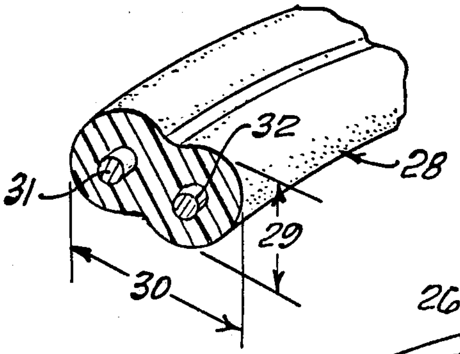
FIG. 4 is a cross-sectional view of an electrical cord having a generally oblong shape.

The device of the present invention is particularly effective in conjunction with oblong electrical cord of the type shown in FIG. 4. Cord 28 has a smaller outside dimension 29 and a larger outside dimension 30 and a pair of conductors 31 and 32. As shown in phantom view in FIG. 3, the smaller outside dimension 29 easily fits between ribs 20 and 21 and as the cord is turned in the channel to the position indicated in solid lines in FIG. 3, the larger outside dimension causes the exterior edges of cord 28 to abut sides 18 and 19 of channel 16. The ribs 20 and 21 help to prevent the cord from easily falling out of channel 16.

Figure 6:
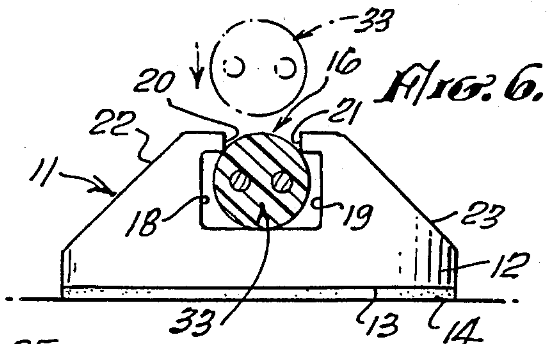
FIG. 6 is a side view of the cord holding device of FIG. 1 with a round electrical cord held therein.

The device of the present invention is also useful for holding round cords. Such cords may be deflected by squeezing the cord between ribs 20 and 21 which then hold the cord in channel 16. A round cord 33 is shown held in channel 16 in FIG. 6.

The device of the present invention is fabricated from a rigid material and is preferably fabricated from a polymer such as polyvinyl chloride to reduce the already unlikely possibility of an electrical short between conductors 31 and 32. Also this provides a light weight and low cost device. While the device has been referred to and is shown in the figures as having a cylindrically shaped body, it cold, of course, be square or rectangular in shape, although the shape shown in the drawings is preferred. The device can be fabricated in various sizes to correspond with the common sizes of electrical outlet cord in use. A device having an outside diameter of one inch was fabricated. The cord holding device had a height of 0.395 inch, a channel depth of 0.270 inch and a channel width of 0.340 inch. The distance between ribs 20 and 21 was 0.280 inch and the thickness of the ribs was 0.050 inch. Such device securely held both an oblong cord and a round cord. It is anticipated that the device will be supplied in three sizes which will fit the vast majority of appliance cords.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. In combination:

an electrical appliance having a surface;

an electrical outlet cord extending from said appliance, said electrical cord having a generally oblong cross-sectional shape, said electrical cord having a large outside dimension and a small outside dimension;

a cord holding device comprising a body having a generally flat bottom having a delayed-tack adhesive affixed thereto, said delayed-tack adhesive affixing said cord holding device to said surface of said appliance and said body being fabricated from a rigid material having sides extending upwardly from the generally flat bottom and said device body having a channel extending from one body side thereof to the opposite body side, said channel having a bottom surface and two channel sides, each of said channel sides terminating in an inwardly directed cord-holding rib, the inner edges of the inwardly directed ribs being separated apart a distance sufficient to permit the passage of the small outside dimension of said electrical outlet cord between the inner edges, when the cord is turned so that its small dimension is placed between the inner edges, and said channel being deep enough so that the cord can be inserted along the length thereof and further being wide enough so that the large outside dimension will fit against the two channel sides when the cord is turned to orient its large dimension against the two channel sides.

2. The combination of claim 1 wherein said cord holding device body is generally cylindrical in shape.

3. The combination of claim 2 wherein said generally cylindrical body has an angled surface on each side of the generally cylindrical body passing from near the inwardly directed ribs to near the bottom thereof.

4. The combination of claim 1 wherein the body is fabricated from an electrically insulative polymeric material.

* * * * *